(12) United States Patent
Yaksh et al.

(10) Patent No.: US 12,353,355 B2
(45) Date of Patent: Jul. 8, 2025

(54) SYSTEMS, METHODS, AND APPARATUSES FOR TRACKING CROSS BORDER DATA TRANSMISSIONS AND GENERATING A DATA PASSPORT ENTRY IN AN ELECTRONIC NETWORK

(71) Applicant: BANK OF AMERICA CORPORATION, Charlotte, NC (US)

(72) Inventors: Rahul Yaksh, Austin, TX (US); Pratap Dande, Saint Johns, FL (US); Erik Dahl, Newark, DE (US); Steven Allan Reich, Manalapan, NJ (US); Vishwanath Prasad Karra, Mckinney, TX (US); Tileshia Brenda Alford, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/977,588

(22) Filed: Oct. 31, 2022

(65) Prior Publication Data

US 2024/0143550 A1 May 2, 2024

(51) Int. Cl.
G06F 16/14 (2019.01)
G06F 16/13 (2019.01)
G06F 16/2457 (2019.01)

(52) U.S. Cl.
CPC .......... *G06F 16/152* (2019.01); *G06F 16/137* (2019.01); *G06F 16/24578* (2019.01)

(58) Field of Classification Search
CPC .. G06F 16/137; G06F 16/152; G06F 16/2365; G06F 16/24578; G06F 16/29; G06F 16/35; G06F 16/951; G06F 40/30; G06F 40/40; G06F 11/3006; G06F 21/577; G06F 21/6227; G06F 21/6245; G06F 21/6254; G06F 2221/2141; G06Q 50/26; G06Q 30/0185; G06N 20/00

See application file for complete search history.

(56) References Cited

U.S. PATENT DOCUMENTS

| | | | |
|---|---|---|---|
| 7,069,427 | B2 | 6/2006 | Adler et al. |
| 7,889,655 | B2 | 2/2011 | Retana et al. |
| 8,140,346 | B2 | 3/2012 | Kaplan |
| 8,839,425 | B1 | 9/2014 | Martini |

(Continued)

*Primary Examiner* — Robert W Beausoliel, Jr.
*Assistant Examiner* — Cheryl M Shechtman
(74) *Attorney, Agent, or Firm* — Moore & Van Allen PLLC; Lauren M. Stokes (57) ABSTRACT

Systems, computer program products, and methods are described herein for tracking cross border data transmissions and generating a data passport entry in an electronic network. The present disclosure is configured to receive a file, the file comprising file data; receive an origination location identifier and destination location identifier of the file; parse the file data and apply a natural language processor to the file data to generate a structured meaning of the file data; compare the structured meaning of the file data to a theme database to generate a file theme score; determine, based on the destination location identifier, a destination theme score; generate a hash value for the file; and generate a data passport entry for the file based on the file name, the origination location identifier, the destination location identifier, the file theme score, the destination theme score, the hash value, and a count score.

15 Claims, 6 Drawing Sheets

(56) References Cited

U.S. PATENT DOCUMENTS

| | | |
|---|---|---|
| 8,983,918 B2 | 3/2015 | Alvarez et al. |
| 9,367,707 B2 * | 6/2016 | Gula .................... H04L 63/1408 |
| 10,798,133 B2 | 10/2020 | Barday et al. |
| 10,846,261 B2 | 11/2020 | Barday et al. |
| 11,138,318 B2 | 10/2021 | Brannon et al. |
| 11,138,337 B2 | 10/2021 | Yousfi et al. |
| 11,244,072 B2 | 2/2022 | Barday et al. |
| 11,514,187 B1 | 11/2022 | Digregoria |
| 2002/0010784 A1 | 1/2002 | Clayton et al. |
| 2002/0023109 A1 | 2/2002 | Lederer et al. |
| 2002/0120477 A1 | 8/2002 | Jinnett |
| 2002/0138407 A1 | 9/2002 | Lawrence et al. |
| 2002/0184068 A1 | 12/2002 | Krishnan et al. |
| 2003/0216986 A1 | 11/2003 | Hassan |
| 2004/0093518 A1 | 5/2004 | Feng et al. |
| 2004/0193634 A1 | 9/2004 | Goodlett et al. |
| 2005/0076233 A1 | 4/2005 | Aarts et al. |
| 2009/0106823 A1 * | 4/2009 | Durski .................... H04L 63/08 726/4 |
| 2019/0013934 A1 * | 1/2019 | Mercuri ................ G06F 21/602 |
| 2020/0220901 A1 * | 7/2020 | Barday .................. H04L 41/22 |
| 2020/0242719 A1 * | 7/2020 | Lee ...................... G06Q 50/265 |
| 2021/0350458 A1 * | 11/2021 | Gaur ...................... G06Q 40/02 |
| 2022/0343236 A1 * | 10/2022 | Daub ................ G06Q 10/0635 |

* cited by examiner

SYSTEMS, METHODS, AND APPARATUSES FOR TRACKING CROSS BORDER DATA TRANSMISSIONS AND GENERATING A DATA PASSPORT ENTRY IN AN ELECTRONIC NETWORK

TECHNOLOGICAL FIELD

Example embodiments of the present disclosure relate to tracking cross border data transmissions and generating a data passport entry in an electronic network.

BACKGROUND

Clients of electronic networks and managers of files that may be transferred across such electronic networks have a harder time than ever tracking file data as it moves within and across geographic regions. Such problems are further increased and intensified where files comprising file data are transferred across different geographic regions, where the different geographic regions may have specific requirements and/or laws which must be abided by for the electronic transfer of data. A need, therefore, exists for a system to track data as it is transmitted between geographic regions.

Applicant has identified a number of deficiencies and problems associated with tracking cross border data transmissions and generating a data passport entry in an electronic network. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for tracking cross border data transmissions and generating a data passport entry in an electronic network.

In one aspect, a system for tracking cross border data transmissions and generating a data passport entry is provided. The system may comprise: a memory device with computer-readable program code stored thereon; at least one processing device operatively coupled to the at least one memory device and the at least one communication device, wherein executing the computer-readable code is configured to cause the at least one processing device to: receive a file, the file comprising file data and a file name; receive an origination location identifier of the file; receive a destination location identifier of the file; parse the file data and apply a natural language processor to the file data to generate a structured meaning of the file data; compare the structured meaning of the file data to a theme database to generate a file theme score; determine, based on the destination location identifier, a destination theme score, wherein the destination theme score is based on a plurality of themes associated with the theme database; generate a hash value for the file; and generate a data passport entry for the file based on the file name, the origination location identifier, the destination location identifier, the file theme score, the destination theme score, the hash value, and a count score.

In some embodiments, the count score may comprise a count of at least one transmission of the file.

In some embodiments, the count score may comprise a count of at least one cross border transmission of the file.

In some embodiments, the theme database may comprise at least one theme, wherein the at least one theme comprises at least one of an electronic transfer theme, a consumer protection theme, a privacy and data protection theme, or a cyber-offense theme. In some embodiments, each of the at least one theme has a destination theme ranking, and wherein the destination theme score may comprise a sequence of destination theme rankings. In some embodiments, each of the destination theme rankings may comprise at least one of a number of zero or one.

In some embodiments, the file theme score may comprise a sequence of file theme rankings, wherein each of the file theme rankings are based on a comparison of at least one theme to the file structure meaning. In some embodiments, the file theme ranking comprises at least one of a number of one, two, three, four, or five.

In some embodiments, at least one of the origination location identifier or the destination location identifier comprises a country code.

In some embodiments, the processing device may further be configured to: store the hash value associated with the file; receive an indication the file data has been altered; generate, based on the indication the file data has been altered, an updated hash value of the file; and generate an updated data passport entry for the file based on the updated hash value.

In some embodiments, the data passport entry is a unique file identifier.

In another aspect, a computer program product for tracking cross border data transmissions and generating a data passport entry is provided. In some embodiments, the computer program product comprises at least one non-transitory computer-readable medium having computer-readable program code portions embodied therein, the computer-readable program code portions which when executed by a processing device are configured to cause the processor to: receive a file, the file comprising file data and a file name; receive origination location identifier of the file; receive a destination location identifier of the file; parse the file data and apply a natural language processor to the file data to generate a structured meaning of the file data; compare the structured meaning of the file data to a theme database to generate a file theme score; determine, based on the destination location identifier, a destination theme score, wherein the destination theme score is based on a plurality of themes associated with the theme database; generate a hash value for the file; and generate a data passport entry for the file based on the file name, the origination location identifier, the destination location identifier, the file theme score, the destination theme score, the hash value, and a count score.

In some embodiments, the theme database comprises at least one theme, wherein the at least one theme comprises at least one of an electronic transfer theme, a consumer protection theme, a privacy and data protection theme, or a cyber-offense theme. In some embodiments, each of the at least one theme has a destination theme ranking, and wherein the destination theme score comprises a sequence of destination theme rankings.

In some embodiments, the file theme score comprises a sequence of file theme rankings, wherein each of the file theme rankings are based on a comparison of at least one theme to the file structure meaning.

In some embodiments, the computer program product may further comprise: store the hash value associated with the file; receive an indication the file data has been altered; generate, based on the indication the file data has been altered, an updated hash value of the file; and generate an updated data passport entry for the file based on the updated hash value.

In another aspect, a computer-implemented method for tracking cross border data transmissions and generating a data passport entry is provided. In some embodiments, the computer-implemented method may comprise: receiving a file, the file comprising file data and a file name; receiving origination location identifier of the file; receiving a destination location identifier of the file; parsing the file data and apply a natural language processor to the file data to generate a structured meaning of the file data; comparing the structured meaning of the file data to a theme database to generate a file theme score; determining, based on the destination location identifier, a destination theme score, wherein the destination theme score is based on a plurality of themes associated with the theme database; generating a hash value for the file; and generating a data passport entry for the file based on the file name, the origination location identifier, the destination location identifier, the file theme score, the destination theme score, the hash value, and a count score.

In some embodiments, the theme database comprises at least one theme, wherein the at least one theme comprises at least one of an electronic transfer theme, a consumer protection theme, a privacy and data protection theme, or a cyber-offense theme. In some embodiments, each of the at least one theme has a destination theme ranking, and wherein the destination theme score comprises a sequence of destination theme rankings.

In some embodiments, the file theme score comprises a sequence of file theme rankings, wherein each of the file theme rankings are based on a comparison of at least one theme to the file structure meaning.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository—a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As described in further detail herein, the present invention provides a solution to the above-referenced problems in the field of technology by generating an accurate, efficient, and real-time tracking system for files as the files are transmitted within geographic regions and across geographic regions. Such a system (i.e., a data passport entry system) may further track—in real-time and across at least one geographic region—each version of the file as it is updated and as it is transmitted. The present invention solves this technical problem by implementing a data passport entry system, like that shown as system 130 in FIGS. 1A-1C and the natural language processor implemented on Machine Learning Model 232 in FIG. 2. For instance, the data passport entry system acts to generate a data passport entry based on a plurality of identifiers and data associated with the file. Such a plurality of identifiers and data may comprise an identifier for the origination location of the file, an identifier of the destination location for the file to be transmitted (e.g., a destination country identifier), a file name (which may be generated at the time the original file is created and/or at a later time by a user associated with an updating of the file data), a destination theme score (which may be based on the themes of the destination location and whether the destination comprises data associated with each identified theme), a file theme score (which may be based on the file's structured meaning—as determined by a natural language processor—as compared to the specified themes), a hash value for the version of the file, and/or the like. Such identifiers and data may be used to then generate the data passport entry.

Accordingly, the data passport entry system works by receiving a file, the file comprising file data and a file name; receiving origination location identifier of the file; and receiving a destination location identifier of the file. The data passport entry system may then parse the file data and apply a natural language processor to the file data to generate a structured meaning of the file data; compare the structured meaning of the file data to a theme database to generate a file theme score; and determine, based on the destination location identifier, a destination theme score, where the destination theme score is based on a plurality of themes associated with the theme database. The data passport entry system may additionally generate a hash value for the file. As a result of each of the identifiers and data generated by the data passport entry system, the data passport entry system may generate the data passport entry for the file based on the file name, the origination location identifier, the destination location identifier, the file theme score, the destination theme score, the hash value, and a count score.

What is more, the present disclosure provides a technical solution to a technical problem. As described herein, the technical problem includes the accurate and efficient tracking of data within files as the files are transmitted within and between geographic regions. The technical solution presented herein allows for the accurate, efficient, and real-time tracking of files as the files are transmitted within and/or between geographic regions by generating and implementing a data passport entry system. In particular, the data passport entry system is an improvement over existing solutions to the accurate, efficient, and real-time tracking problems identifier herein (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

Figure 1A:
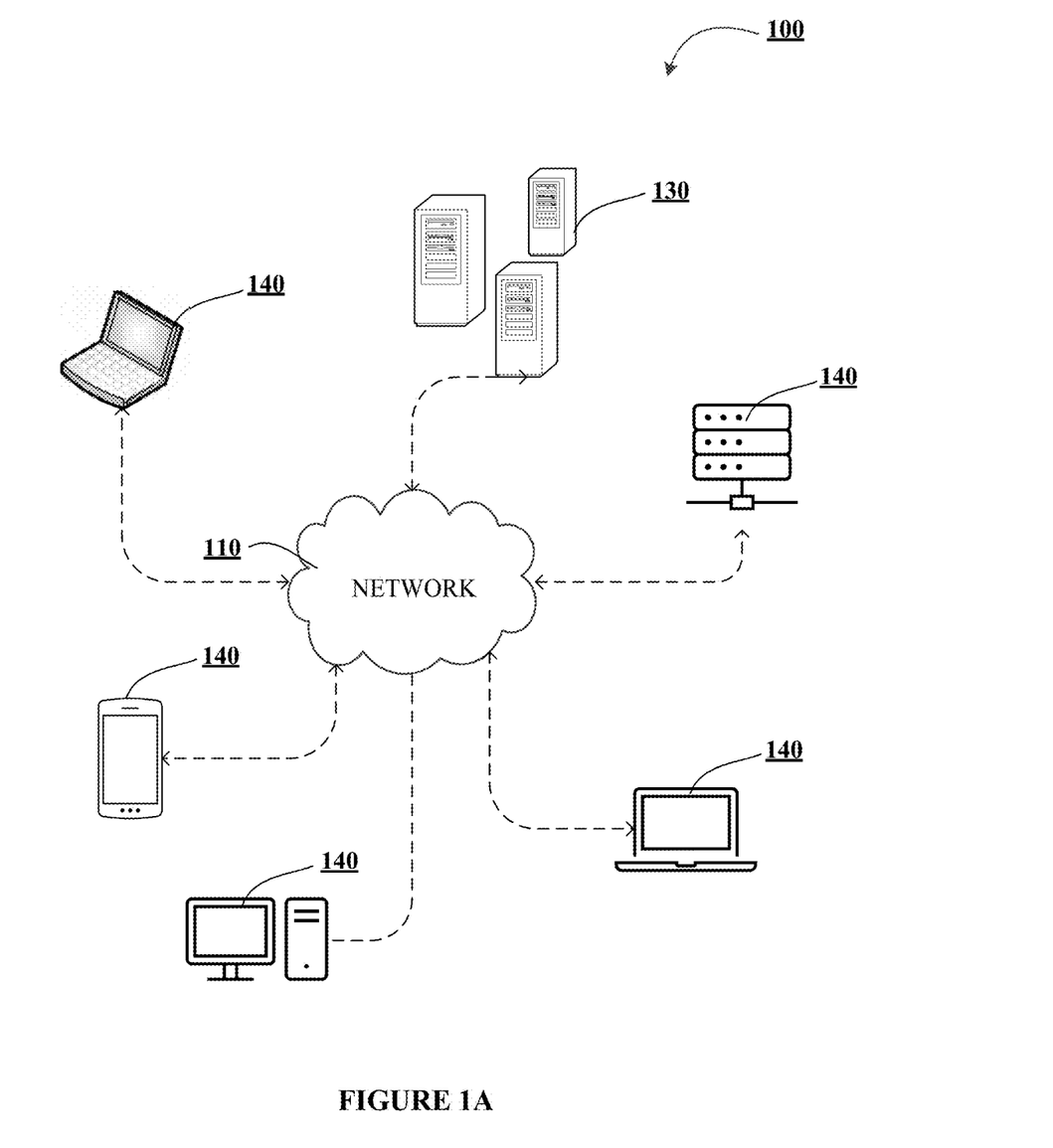
FIGS. 1A-1C illustrates technical components of an exemplary distributed computing environment for tracking cross border data transmissions and generating a data passport entry in an electronic network, in accordance with an embodiment of the disclosure.
Figure 1B:
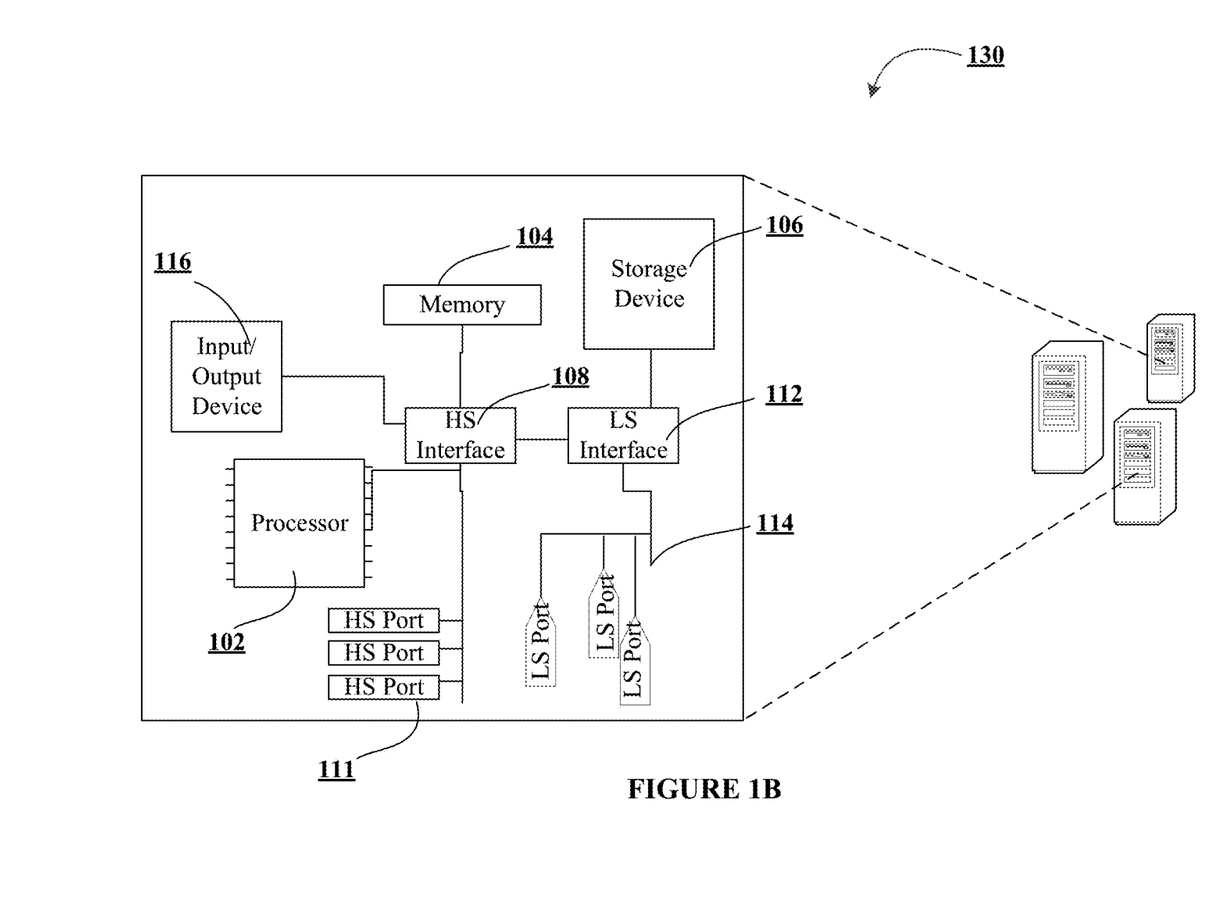
Figure 1C:
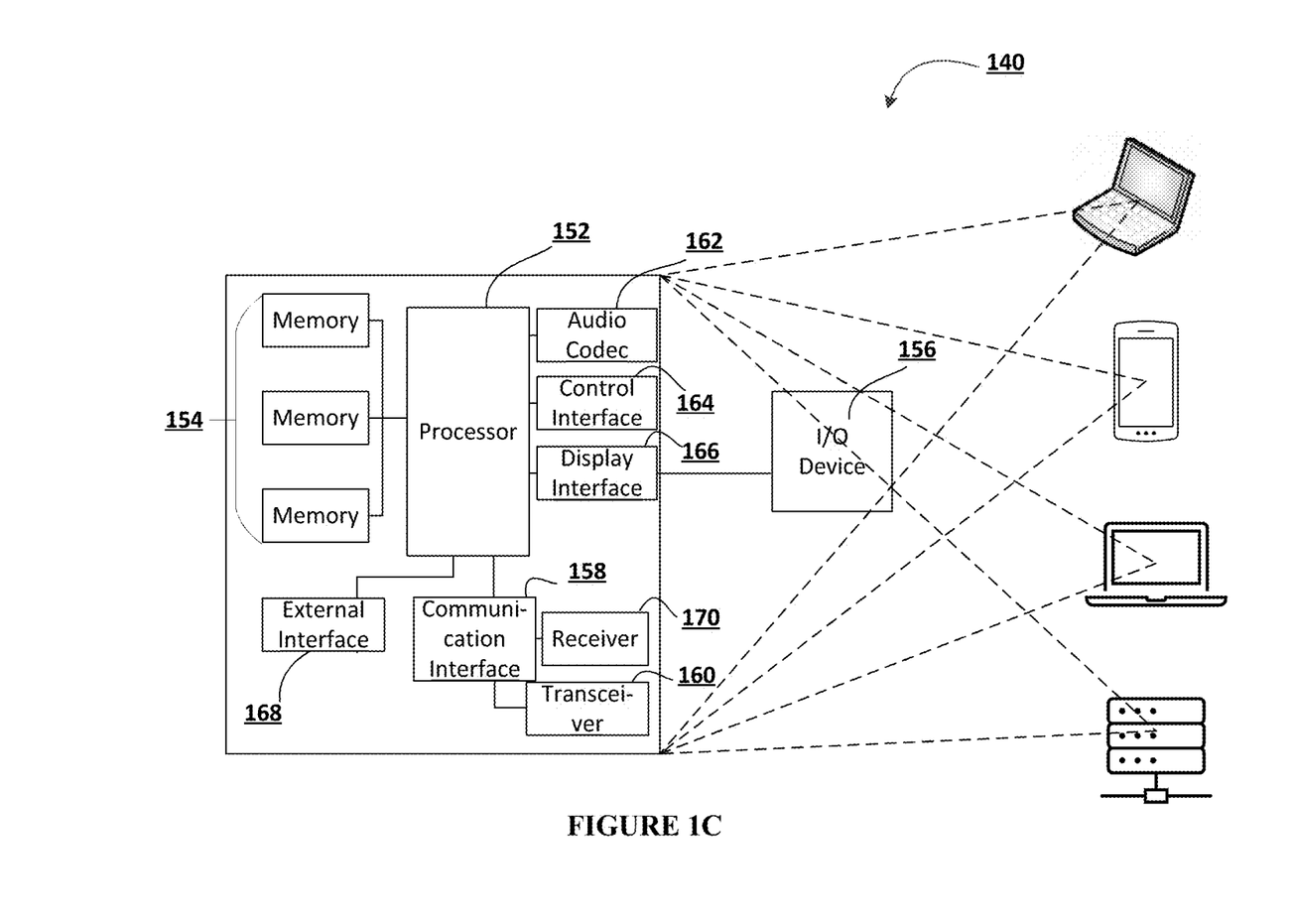

FIGS. 1A-1C illustrate technical components of an exemplary distributed computing environment for tracking cross border data transmissions and generating a data passport entry in an electronic network 100, in accordance with an embodiment of the invention. As shown in FIG. 1A, the distributed computing environment 100 contemplated herein may include a system 130 (i.e., data passport entry system), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low speed bus 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

Figure 2:
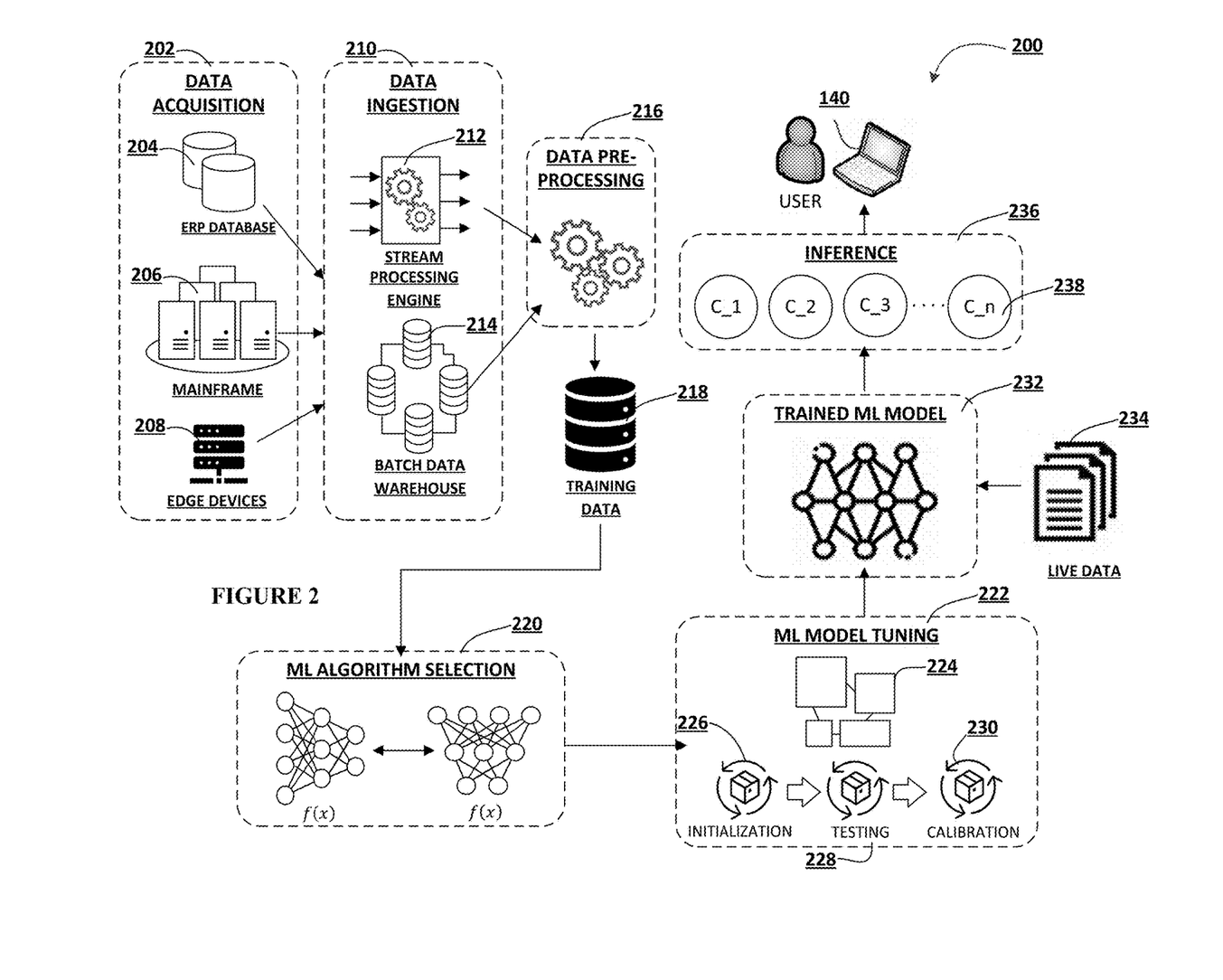
FIG. 2 illustrates technical components of an exemplary natural language processor for tracking cross border data transmissions and generating a data passport entry in an electronic network, in accordance with an embodiment of the disclosure.

FIG. 2 illustrates an exemplary machine learning (ML) subsystem architecture 200 for implementing a natural language processor, in accordance with an embodiment of the invention. The machine learning subsystem 200 may include a data acquisition engine 202, data ingestion engine 210, data pre-processing engine 216, ML model tuning engine 222, and inference engine 236. By way of non-limiting example, the ML model may be used to implement the natural language processor by allowing the natural language processor to analyze training data sets with specified structured meanings, where the natural language processor may be trained to automatically learn the rules to determine the structured meanings based on continuous training data sets and feedback for each output the natural language processor may generate.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data %18 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . 0 n 238) live data 234 based on how similar they are to one another to solve exploratory challenges where little is known about the data, provide a description or label (e.g., C_1, C_2 . . . 0 n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated for implementing the natural language processor in FIG. 2 is exemplary and that other embodiments may vary. As another example, in some embodiments, the machine learning subsystem 200 may include more, fewer, or different components.

Figure 3:
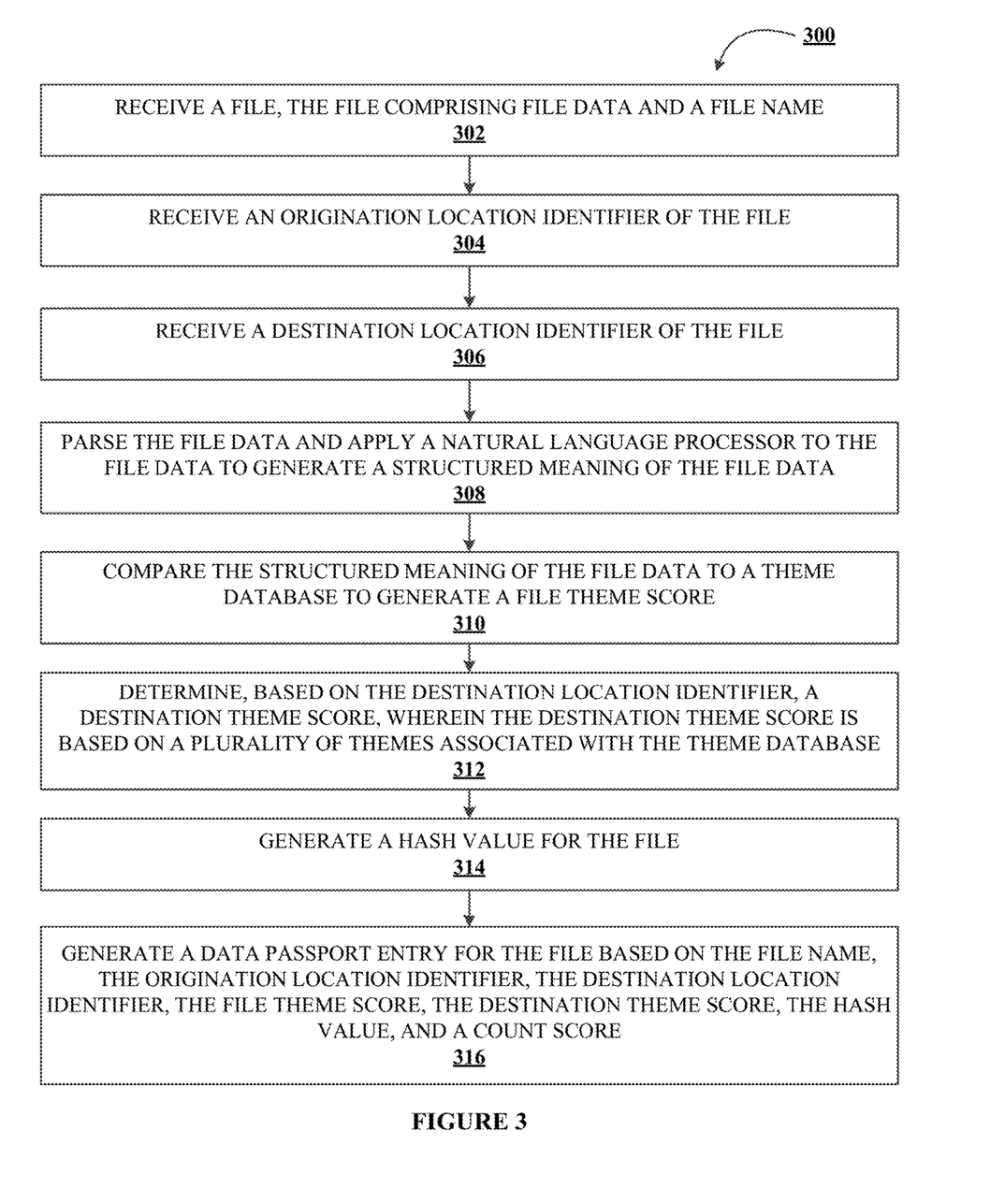
FIG. 3 illustrates a process flow for tracking cross border data transmissions and generating a data passport entry in an electronic network, in accordance with an embodiment of the disclosure.

FIG. 3 illustrates a process flow 300 for tracking cross border data transmissions and generating a data passport entry in an electronic network, in accordance with an embodiment of the invention. In some embodiments, a system (e.g., similar to one or more of the systems described herein with respect to FIGS. 1A-1C and 2) may perform one or more of the steps of process flow 300. For example, a data passport entry system (e.g., the system 130 described herein with respect to FIGS. 1A-1C) may perform the steps of process flow 300.

As shown in block 302, the process flow 300 may include the step of receiving a file, the file comprising file data and a file name. In some embodiments, the data passport entry system may receive a file from a user device, a database or memory, a server, and/or the like. In some embodiments, the file received by the system may comprise at least a file name which may, in some embodiments, indicate the content of the file (e.g., the content of the file data). For instance, a user or manager associated with the file may generate the file name, such as the user that generated the file. In some embodiments, the data passport entry system may generate the file name through the use of the natural language processor analyzing the file data of the file and attaching, based on the analyzation, a file name indicating the content of the file.

As shown in block 304, the process flow 300 may include the step of receiving an origination location identifier of the file. By way of non-limiting example, the data passport entry system may receive an origination location identifier of the file, where the origination location identifier may comprise data indicating the city, state, country, continent, and/or the like where the file was generated or originated. In some embodiments and where a file may be changed or amended (e.g., the file data may be changed), the data passport entry system may keep the origination location identifier as the original origination location identifier from the first version of the file. In some embodiments, the data passport entry system may assign a new origination location identifier for the file, where the new origination location identifier is associated with the location of the file at the time of the change or amendment.

In some embodiments, the origination location identifier may be a code generated by an organization or agency, such as the Organization of Standardization's (ISO) country code. For instance, such a country code for the origination location identifier may comprise at least one of the following country codes associated with the following origination countries: Afghanistan (004), Canada (124), China (156), Egypt (818), India (356), Iran (364), Iraq (368), Japan (392), Russia (643), United Kingdom (826), United States (840), and/or the like.

As shown in block 306, the process flow 300 may include the step of receiving a destination location identifier of the file. In some embodiments, the data passport entry system may receive a destination location identifier indicating the location for which the file is intended to be transmitted and/or a location of a server for which the file is intended to be transmitted. In some embodiments, the destination location identifier of the file may be received at the time the file is requested to be transmitted (e.g., a request by the data passport entry system itself, a manager of the data passport entry system, a user of the data passport entry system, a user associated with the file (e.g., a user who generated the file, a user who has data access privileges of the file, and/or the like)).

Similar to the origination location identifier, and in some embodiments, the data passport entry system may use country codes generated by the ISO for the destination location identifier. For instance, such a country code for the destination location identifier may comprise at least one of the following country codes associated with the following origination countries: Afghanistan (004), Canada (124), China (156), Egypt (818), India (356), Iran (364), Iraq (368), Japan (392), Russia (643), United Kingdom (826), United States (840), and/or the like.

In some embodiments, the original file may be associated with a plurality of destination location identifiers, where each destination location identifier is associated with the intended and/or requested destination of the file (or a copy of the file). For instance, each copy of the file may have a different destination location identifier based on where the file was transmitted to and at what time.

As shown in block 308, the process flow 300 may include the step of parsing the file data and applying a natural language processor to the file data to generate a structured meaning of the file data. In some embodiments, the data passport entry system may parse the file data of the file and input the file data into a natural language processor (e.g., like that described in FIG. 2 which is implemented by machine learning model 232) for determination or generation of a structured meaning of the file data. In some embodiments, the natural language process may parse the data itself and then analyze the parsed data within its system.

By way of non-limiting example, the structured meaning of the file data may be the output of the natural language processor and its determined meaning of the file data. For instance, the data passport entry system and its associated natural language processor may be trained based on previous training data sets, such as training data sets comprising predefined examples of structured meaning (e.g., an understanding of the semantic meaning to the text and/or spoken words within the data) for which the natural language processor may be trained. Based on the initial training, the natural language processor may output a structured meaning for the training data set and compare the output structured meaning to the predefined structured meaning attached to the training data set as a training feedback loop. In some embodiments, the natural language processor may be trained a plurality of times such that there are at least two training data sets input into the natural language processor. Based on the training described supra, the natural language processor may be refined as it is continuously trained with the plurality of training data sets, based on the training feedback loop. In some embodiments, and as the natural language processor outputs the structured meaning of the file data for a plurality of files, in real-time, a feedback loop may allow a user of the data passport entry system, a manager of the data passport entry system, a user associated with the file, and/or the like, to generate a correct structured meaning of the file data such that the natural language processor may continuously be trained during real-time use.

As shown in block 310, the process flow 300 may include the step of comparing the structured meaning of the file data to a theme database to generate a file theme score. In some embodiments, the data passport entry system may compare the structured meaning of the file data from the natural language processor against a theme database comprising at least data regarding at least one theme. For instance, the theme database may comprise data regarding at least one theme such as an electronic transfer theme (i.e., electronic transfer legislation), a consumer protection theme (i.e., consumer protection legislation), a privacy and data protection theme (i.e., privacy and data protection legislation), a cyber-offense theme (i.e., legislation related to cyber malfeasance/offenses, such as cyber-attacks, misrepresentations, and/or the like), and/or the like.

In some embodiments, the theme database may segregate and/or sort the data associated within each theme based on the location of each theme data. The data associated with the consumer protection theme may comprise at least one dataset, where each dataset comprises data regarding the consumer protection theme within different locations (e.g., countries). By way of non-limiting example, a location such as the United States may have data regarding the consumer protection theme (e.g., may have legislation directed to consumer protection), but a location such as India may not have data regarding the consumer protection theme (e.g., may not have legislation directed to consumer protection). In this manner, the theme database may track each location's (e.g., each country within the world) theme data in order to determine which location has what themes (i.e., legislation) and may store such determinations in the theme database. By way of non-limiting example, the theme database may comprise a binary score in order to track which locations have themes directed to each of the themes within the theme database. In some embodiments, the theme database may store the entirety of the data regarding each theme, which may comprise the text data of each theme (i.e., legislation) for each location.

In some embodiments, and based on such storage of the entire data for each theme and for each location (where the theme is present), the data passport entry system may compare the structured meaning of the file data against the theme database (and its associated theme data for each theme associated with a specified location—such as the destination location for the file) to determine how similar the file data is to each theme (which may be used to indicate the relevancy of the file data to each theme). In some embodiments, the data passport entry system may generate a file theme ranking for each theme for the file data, where the file theme ranking may comprise a ranking between zero and five, where five may indicate a high relevancy to the theme and zero may indicate no relevancy to the theme. In some embodiments, the file theme ranking may comprise a single-digit number, such as zero, one, two, three, four, five, six, seven, eight, nine. In some embodiments and based on the file theme ranking for each theme, the data passport entry system may generate a file theme score based on the at least one file theme ranking.

For instance, the data passport entry system may generate the file theme score to be a sequence of the file theme rankings, where the sequence is a specified sequence and where each file theme ranking has its own place within the specified sequence. Such a sequence for the file theme score may comprise a sequence of <electronic transfer theme><consumer protection theme><privacy and data protection theme><cyber-offense theme>, such that the file theme score comprises the file theme rankings in the order of 5410 (e.g., the file theme—based on the relevancy of the file (e.g., the structure meaning of the file data) to the electronic transfer theme—is five which indicates the highest relevancy; the file theme—based on the relevancy of the file (e.g., the structure meaning of the file data) to the consumer protection theme—is four which indicates a high relevancy; the file theme—based on the relevancy of the file (e.g., the structure meaning of the file data) to the privacy and data protection theme—is one which indicates a low relevancy; the file theme—based on the relevancy of the file (e.g., the structure meaning of the file data) to the cyber-offense theme—is zero which indicates no relevancy. As will be understood by a person of skill in the art, any combination of themes for the sequence of file theme rankings and any single-digit value (e.g., zero, one, two, three, four, five, six, seven, eight, nine, and/or the like) may be used to generate the file theme score.

As shown in block 312, the process flow 300 may include the step of determining, based on the destination location identifier, a destination theme score, wherein the destination theme score is based on a plurality of themes associated with the theme database. In some embodiments, the theme database may segregate and/or sort the data associated within each theme based on the location of each theme data. In some embodiments and based on the binary score for the presence of themes for each location, the data passport entry system may generate the destination theme ranking based on the binary score. For instance, such a destination theme ranking may be based on the determination of whether the destination location for which the file is intended to be sent (e.g., a request for transmitting the file comprises a destination location identifier) comprises the theme for which the destination theme ranking is associated with. By way of non-limiting example, the destination theme ranking may be zero where the destination location (e.g., the destination country) does not have legislation for the theme associated with the destination theme ranking. Additionally, and in some embodiments, the destination theme ranking may be one where the destination location does have legislation for the theme associated with the destination theme ranking.

In some embodiments and based on the determined destination theme ranking for each of the themes (e.g., electronic transfer theme, consumer protection theme, privacy and data protection theme, cyber-offense theme, and/or the like), the data passport entry system may generate a destination theme score for the destination location. The destination theme score may comprise a sequence of destination theme rankings such that the destination theme score is a sequence of binary numbers indicating, based on each location of each binary number within the sequence, whether the destination location has legislation for each of the themes. For instance, the sequence may comprise any combination of themes in a specified order (such as an order specified by the user of the data passport entry system, an order specified by the manager of the data passport entry system, and/or the like) such that each theme has its specified spot within the destination theme score. By way of non-limiting example, such a sequence may be shown as <electronic transfer theme><consumer protection theme><privacy and data protection theme><cyber-offense theme>, such that the actual destination location score comprises the destination theme rankings in the order of 1101 (e.g., the electronic transfer theme comprises a ranking of one, the consumer protection theme comprises a ranking of one, the privacy and data protection theme comprises a ranking of zero, and the cyber-offense theme comprises a ranking of one). As will be understood by a person of skill in the art, any combination of themes for the sequence of destination theme rankings and any single-digit value (e.g., zero, one, two, three, four, five, six, seven, eight, nine, and/or the like) may be used to generate the destination theme score.

In some embodiments, the theme database may store the entirety of the data associated with each theme and for each location (where legislation is present). In some embodiments and based on the entire storage of the theme data for each location, the data passport entry system may periodically update its theme data stored in the theme database by web-scraping and determining—after each web-scraping—whether each location comprises legislation for each theme. For instance, the data passport entry system may implement a web-scraper and/or the like to collect and analyze data of each theme within each location. In some embodiments, the natural language processor may be configured to act in association with the web-scraper to determine whether the location does have legislation for each of the themes. Such instances may occur where the web-scraper, by itself, cannot determine whether legislation is present.

As shown in block 314, the process flow 300 may include the step of generating a hash value for the file. In some embodiments, the data passport entry system may generate a unique hash value for each file associated with the data passport entry system (e.g., each file for which the data passport entry system is intended to generate a data passport). By way of non-limiting example, the hash value may be generated by certain algorithms (e.g., such as Message Digest 5, "MD5"; Secure Hashing Algorithm, "SHA"; and/or the like). Such a hash value may be unique to each file and each version of each file. For instance, and where file data associated a file has changed, a new hash value may be generated to show an alteration to the original file data and to indicate a version of the file. In some embodiments, the hash value may be generated at a time when the file is first saved, at a time when the file is first generated/created, and/or the like. Such a hash value is described in further detail below with respect to FIG. 4.

As shown in block 316, the process flow 300 may include the step of generating a data passport entry for the file based on the file name, the origination location identifier, the destination location identifier, the file theme score, the destination theme score, the hash value, and a count score. In some embodiments, the data passport entry system may generate a data passport entry for the file based on at least one of the file name, the origination location identifier, the destination location identifier, the file theme score, the destination theme score, the hash value, and/or a count score.

By way of non-limiting example, the count score may be generated to count a number of times the specific version of the file is shared and/or transmitted within a destination location associated with the destination location identifier (e.g., within the same destination, city, county, state, country, and/or the like). For instance, and where the destination location comprises an entire country, the data passport entry system may generate a count score and add (in specified increments, such as increments of one) to the count score as the file is transmitted within the country. By way of non-limiting example and as the file is transmitted outside of the country, at least a new count score and a new destination location identifier may be generated and used in generating the data passport entry. By way of non-limiting example, the count score may comprise a count of at least one cross border transmission of the file, where the file is being transmitted across a geographic border for the first time.

Based on each of the file name, the origination location identifier, the destination location identifier, the file theme score, the destination theme score, the hash value, and/or the count score, the data passport entry system may generate the data passport entry as a unique file identifier to be associated with the file. For instance, the data passport entry system may generate the data passport entry to comprise a specific sequence of each of the above identifiers, such as but not limited to <file name>, <origination location identifier>, <destination location identifier>, <file theme score>, <destination theme score>, <hash value>, <count value>. As will be understood by a person of skill in the art, any combination or sequence of the identifiers listed above may be used to generate the data passport entry, where such combinations may comprise only a few of the identifiers above and/or may comprise more than the identifiers listed above.

Figure 4:
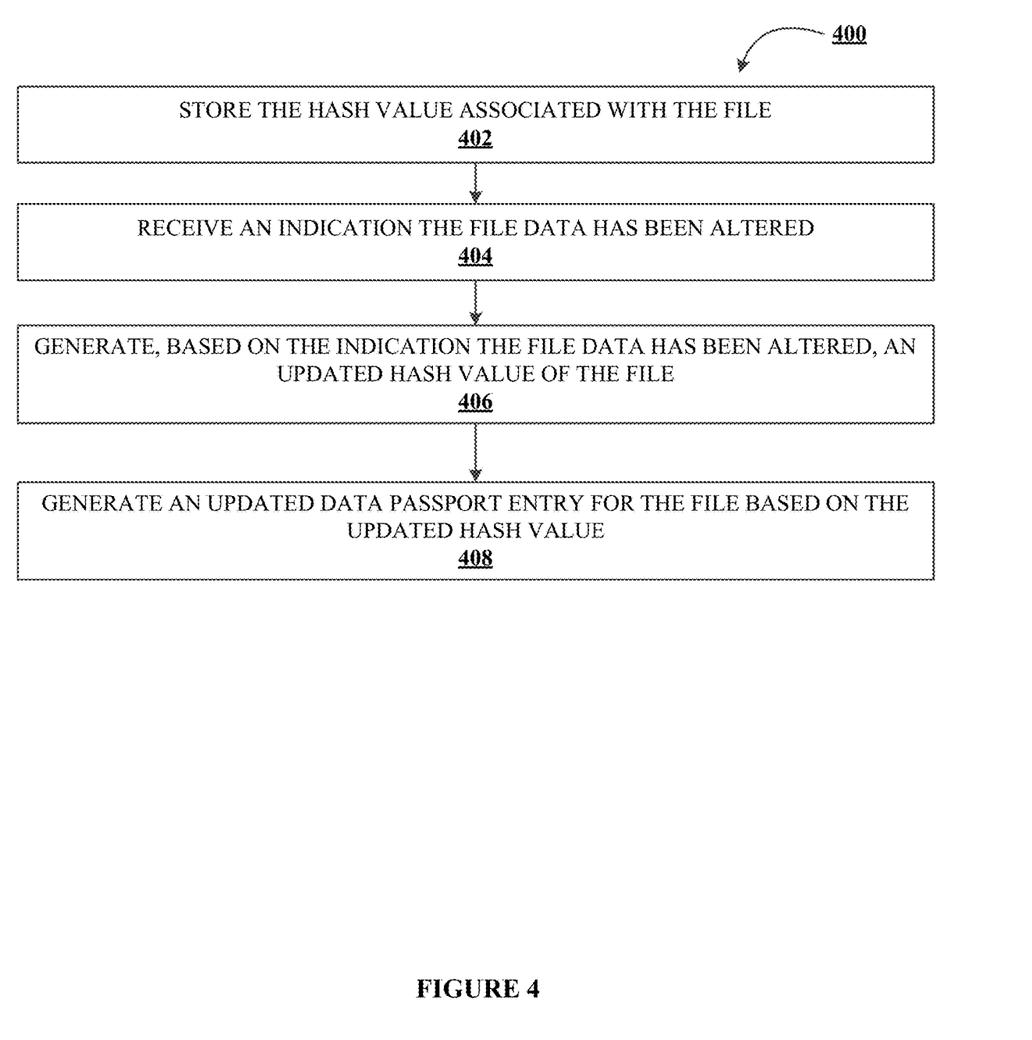
FIG. 4 illustrates a process flow for generating an updated data passport entry for the file based on an updated hash value, in accordance with an embodiment of the invention.

FIG. 4 illustrates a process flow 400 for generating an updated data passport entry for the file based on an updated hash value, in accordance with an embodiment of the invention. In some embodiments, a system (e.g., similar to one or more of the systems described herein with respect to FIGS. 1A-1C and 2) may perform one or more of the steps of process flow 400. For example, a data passport entry system (e.g., the system 130 described herein with respect to FIGS. 1A-1C) may perform the steps of process flow 400.

As shown in block 402, the process flow 400 may include the step of storing the hash value associated with the file. In some embodiments, the data passport entry system may store a previously generated hash value (e.g., an original hash value for the file, an updated hash value based on a change in the file data, and/or the like) in a memory and/or database of the data passport entry system, such as storage device 106, memory 104, memory 154, and/or the like. Such a storage of the hash value and, in some embodiments, any associated hash values of the file—which may include all hash values associated with each version of the file—may be stored by the data passport entry system to keep a complete record of the file as it is changed and/or altered.

As shown in block 404, the process flow 400 may include the step of receiving an indication the file data has been altered. In some embodiments, the data passport entry system may receive an indication that the file data has been altered—which may indicate that the current version (the altered version) was altered from the original version and/or from a previously altered version—from a device or component associated with the data passport entry system. For instance, a user device associated with a user (e.g., a user who has data access capabilities and/or data change capabilities) may transmit a signal indicating the file has been updated by the user from their associated device. In some embodiments and upon saving the new file data (e.g., the updated file data), the data passport entry system may generate a new, unique hash value. In some embodiments, the data passport entry system may receive an indication that the file data has been altered within the data passport entry system itself by continuously monitoring the file data that is stored in the data passport entry system at set intervals (e.g., every few seconds, every minute, every thirty minutes, every hour, and/or the like).

As shown in block 406, the process flow 400 may include the step of generating, based on the indication the file data has been altered, an updated hash value of the file. In some embodiments, the data passport entry system may generate—based on the indication the file data has been altered and/or updated—an updated hash value that is unique for the specific version of the file.

As shown in block 408, the process flow 400 may include the step of generating an updated data passport entry for the file based on the updated hash value. By way of non-limiting example, the data passport entry system may generate the updated data passport entry for the file to comprise a sequence of identifiers which may include, but is not limited to including, <file name>, <origination location identifier>, <destination location identifier>, <file theme score>, <destination theme score>, <updated hash value>, <count value>. By way of non-limiting example, the data passport entry system may use the updated hash value for each of the data passport entries where the file data remains the same, but where the destination location may change and/or where the count value may change.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for tracking cross border data transmissions and generating a data passport entry, the system comprising:
    a memory device with computer-readable program code stored thereon;
    at least one processing device operatively coupled to the at least one memory device and the at least one communication device, wherein executing the computer-readable code is configured to cause the at least one processing device to:
        receive a file, the file comprising file data and a file name;
        receive an origination location identifier of the file;
        receive a destination location identifier of the file;
        parse the file data and apply a natural language processor to the file data to generate a structured meaning of the file data;
        compare the structured meaning of the file data to a theme database to generate a file theme score, wherein the theme database comprises at least one theme, and wherein each of the at least one theme has a destination theme ranking comprising a sequence of destination theme rankings, and the sequence of destination theme rankings comprises a specified order of each destination theme ranking within the sequence and each destination theme ranking comprises a ranking for each theme based on the destination location identifier;
        determine, based on the destination location identifier, a destination theme score, wherein the destination theme score is based on a plurality of themes associated with the theme database;
        generate a hash value for the file;
        generate a data passport entry for the file based on the file name, the origination location identifier, the destination location identifier, the file theme score, the destination theme score, the hash value, and a count score;
        store the hash value associated with the file;
        receive an indication the file data has been altered;
        generate, based on the indication that the file data has been altered, an updated hash value of the file; and generate an updated data passport entry for the file based on the updated hash value.

2. The system of claim 1, wherein the count score comprises a count of at least one transmission of the file.

3. The system of claim 1, wherein the count score comprises a count of at least one cross border transmission of the file.

4. The system of claim 1, wherein the at least one theme comprises at least one of an electronic transfer theme, a consumer protection theme, a privacy and data protection theme, or a cyber-offense theme.

5. The system of claim 1, wherein each of the destination theme rankings comprises at least one of a number of zero or one.

6. The system of claim 1, wherein the file theme score comprises a sequence of file theme rankings, wherein each of the file theme rankings are based on a comparison of at least one theme to the structured meaning of the file data.

7. The system of claim 6, wherein the file theme ranking comprises at least one of a number of one, two, three, four, or five.

8. The system of claim 1, wherein at least one of the origination location identifier or the destination location identifier comprises a country code.

9. The system of claim 1, wherein the data passport entry is a unique file identifier.

10. A computer program product for tracking cross border data transmissions and generating a data passport entry, the computer program product comprising a non-transitory computer-readable medium comprising code causing an apparatus to:
receive a file, the file comprising file data and a file name;
receive origination location identifier of the file;
receive a destination location identifier of the file;
parse the file data and apply a natural language processor to the file data to generate a structured meaning of the file data;
compare the structured meaning of the file data to a theme database to generate a file theme score, wherein the theme database comprises at least one theme, and wherein each of the at least one theme has a destination theme ranking comprising a sequence of destination theme rankings, and the sequence of destination theme rankings comprises a specified order of each destination theme ranking within the sequence and each destination theme ranking comprises a ranking for each theme based on the destination location identifier;
determine, based on the destination location identifier, a destination theme score, wherein the destination theme score is based on a plurality of themes associated with the theme database;
generate a hash value for the file;
generate a data passport entry for the file based on the file name, the origination location identifier, the destination location identifier, the file theme score, the destination theme score, the hash value, and a count score
store the hash value associated with the file;
receive an indication the file data has been altered;
generate, based on the indication that the file data has been altered, an updated hash value of the file; and
generate an updated data passport entry for the file based on the updated hash value.

11. The computer program product of claim 10, wherein the at least one theme comprises at least one of an electronic transfer theme, a consumer protection theme, a privacy and data protection theme, or a cyber-offense theme.

12. The computer program product of claim 10, wherein the file theme score comprises a sequence of file theme rankings, wherein each of the file theme rankings are based on a comparison of at least one theme to the structured meaning of the file data.

13. A computer-implemented method for tracking cross border data transmissions and generating a data passport entry, the computer-implemented method comprising:
receiving a file, the file comprising file data and a file name;
receiving origination location identifier of the file;
receiving a destination location identifier of the file;
parsing the file data and apply a natural language processor to the file data to generate a structured meaning of the file data;
comparing the structured meaning of the file data to a theme database to generate a file theme score, wherein the theme database comprises at least one theme, and wherein each of the at least one theme has a destination theme ranking comprising a sequence of destination theme rankings, and the sequence of destination theme rankings comprises a specified order of each destination theme ranking within the sequence and each destination theme ranking comprises a ranking for each theme based on the destination location identifier;
determining, based on the destination location identifier, a destination theme score, wherein the destination theme score is based on a plurality of themes associated with the theme database;
generating a hash value for the file;
generating a data passport entry for the file based on the file name, the origination location identifier, the destination location identifier, the file theme score, the destination theme score, the hash value, and a count score
storing the hash value associated with the file;
receiving an indication the file data has been altered;
generating, based on the indication that the file data has been altered, an updated hash value of the file; and
generating an updated data passport entry for the file based on the updated hash value.

14. The computer implemented method of claim 13, wherein the at least one theme comprises at least one of an electronic transfer theme, a consumer protection theme, a privacy and data protection theme, or a cyber-offense theme.

15. The computer implemented method of 13, wherein the file theme score comprises a sequence of file theme rankings, wherein each of the file theme rankings are based on a comparison of at least one theme to the structured meaning of the file data.

* * * * *